US009870396B2

(12) United States Patent
Attaluri et al.

(10) Patent No.: US 9,870,396 B2
(45) Date of Patent: Jan. 16, 2018

(54) IMMEDIATE JOIN SPILLING SCHEME FOR A DATABASE

(71) Applicant: International Business Machines Corporation, Armonk, NY (US)

(72) Inventors: Gopi K. Attaluri, San Jose, CA (US); Francisco J. Bermudez, Milpitas, CA (US); Vijayshankar Raman, Sunnyvale, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 686 days.

(21) Appl. No.: 14/206,089

(22) Filed: Mar. 12, 2014

(65) Prior Publication Data

US 2015/0261818 A1 Sep. 17, 2015

(51) Int. Cl.
*G06F 17/30* (2006.01)

(52) U.S. Cl.
CPC .. *G06F 17/30466* (2013.01); *G06F 17/30498* (2013.01); *G06F 17/3048* (2013.01)

(58) Field of Classification Search
CPC ......... G06F 17/30498; G06F 17/30501; G06F 17/3033; G06F 17/30412; G06F 17/30445; G06F 17/30463; G06F 17/3048
See application file for complete search history.

(56) References Cited

U.S. PATENT DOCUMENTS 6,122,644 A * 9/2000 Graefe .............. G06F 17/30595
6,834,279 B1 12/2004 Chiang
7,617,179 B2 11/2009 Nica
7,644,062 B2 1/2010 Su et al.
7,702,627 B2 4/2010 Ahmed et al.
2003/0065688 A1* 4/2003 Dageville ......... G06F 17/30306
2005/0222965 A1* 10/2005 Chaudhuri ........ G06F 17/30522
2006/0218123 A1* 9/2006 Chowdhuri ....... G06F 17/30445

(Continued)

OTHER PUBLICATIONS

Kim et al., "Sort vs. Hash Revisited: Fast Join Impementation on Modern Multi-Core CPUs", 2009, ACM.*
Larson et al., "Enhancements to SQL Server Column Stores", Jun. 27, 2013, ACM.*
G. Graefe, "Query Evaluation Techniques for Large Databases", 1993, ACM.*
Raman et al., "DB2 with BLU Acceleration: So Much More than Just a Column Store", Aug. 30, 2013, Proceedings of the VLDB Endowment, vol. 6, No. 11.*

(Continued)

*Primary Examiner* — Apu Mofiz
*Assistant Examiner* — Sheryl Holland
(74) *Attorney, Agent, or Firm* — Cantor Colburn LLP; Bryan W Butler

(57) ABSTRACT

Embodiments relate to an immediate join spilling scheme for a database. An aspect includes receiving a command to perform a join of an inner table and an outer table in a database. Another aspect includes spilling a plurality of hash tables to a disk memory, each hash table corresponding to a respective inner table partition. Another aspect includes registering, by a first agent of a plurality of agents, a set of inner table partitions that require processing by the first agent to complete the join for a first stride of rows of the outer table. Another aspect includes, based on determining that a hash table corresponding to a registered inner table partition of the first agent has been loaded into the local memory by the second agent of the plurality of agents, performing the join of the loaded hash table and the first stride of rows of the outer table by the first agent.

17 Claims, 7 Drawing Sheets

(56) References Cited

U.S. PATENT DOCUMENTS

| | | | | |
|---|---|---|---|---|
| 2007/0233439 | A1* | 10/2007 | Carroll | G06F 17/5022 703/6 |
| 2007/0250470 | A1* | 10/2007 | Duffy | G06F 17/30445 |
| 2008/0177722 | A1* | 7/2008 | Lohman | G06F 17/30979 |
| 2009/0083238 | A1* | 3/2009 | Chaudhuri | G06F 17/30501 |
| 2009/0119247 | A1* | 5/2009 | Bellamkonda | G06F 17/30498 |
| 2009/0249023 | A1* | 10/2009 | Qiao | G06F 17/30489 711/216 |
| 2010/0106711 | A1 | 4/2010 | Graefe | |
| 2010/0205351 | A1 | 8/2010 | Wiener et al. | |
| 2011/0153593 | A1 | 6/2011 | Zhou et al. | |
| 2011/0213766 | A1 | 9/2011 | Hong et al. | |
| 2012/0047158 | A1 | 2/2012 | Lee | |
| 2012/0117056 | A1* | 5/2012 | Al-Omari | G06F 17/30445 707/714 |
| 2012/0246147 | A1 | 9/2012 | Lamb et al. | |
| 2013/0054568 | A1 | 2/2013 | Chen et al. | |
| 2014/0214794 | A1* | 7/2014 | Attaluri | G06F 17/30466 707/714 |
| 2014/0250142 | A1* | 9/2014 | Pradhan | G06F 17/3033 707/765 |
| 2014/0351239 | A1* | 11/2014 | Davis | G06F 17/30483 707/718 |
| 2015/0220600 | A1* | 8/2015 | Bellamkonda | G06F 17/30498 707/747 |

OTHER PUBLICATIONS

Ye et al., "Scalable Aggregation on Multicore Processors", 2011, Proceedings of the Seventh International Workshop on Data Management on New Hardware, (DaMoN 2011), Jun. 13, 2011.*

Boncz et al., "Breaking the Memory Wall in MonetDB", 2008, Communications of the ACM.*

Gold et al., "Accelerating Database Operators Using a Network Processor", 2005, Proceedings of the First International Workshop on Data Management on New Hardware (DaMoN 2005), ACM.*

Gray et al., "The Five-Minute Rule Ten Years Later, and Other Computer Storage Rules of Thumb", SIGMOD, 1997.*

Garcia et al., "Database Hash-Join Alogorithms on Multithreaded Computer Architectures", 2006, ACM.*

G. Graefe, "New Algorithms for Join and Grouping Operations," Computer Science—Research and Development (Journal), v. 27, n. 1, pp. 3-27, Feb. 2012, published by Springer-Berlin.

J. Li, et al., "A Selection Method of Join Strategy in Column Store Based Query," Journal of Computer Science and Fronfiers, v. 4, n. 9, pp. 850-858; Sep. 2010.

"Are Joins Really Bad or a Columnar Database Like Vertica or Vectorwise?", http://www.quora.com.Column-Oriented-Databases/Are-joins-really-bad-for-a-columnar-database-like-vertica-or-vectorwise#, accessed May 6, 2013, last changed Feb. 27, 2013; 2 pages.

* cited by examiner

IMMEDIATE JOIN SPILLING SCHEME FOR A DATABASE

BACKGROUND

The present disclosure relates generally to databases, and more specifically, to an immediate join spilling scheme for a database.

Columnar databases that employ extensive compression have become popular for data storage applications. In a computing system including a columnar database, during query processing, the required data from the database is loaded from the database into a relatively small, fast memory that is local to the processor for processing of the data. The local memory may comprise, for example, dynamic random access memory (DRAM). The intermediate state of queries may also be held in the local memory, enabling relatively fast performance of queries on the data in the database. However, as such database systems deal with more general workloads and concurrent queries, spilling of data across multiple levels of memory (to, for example, a disk memory that comprises a larger, relatively slow memory as compared to the local memory) may be required if the data for a query does not fit in the local memory.

BRIEF SUMMARY

Embodiments include a method, system, and computer program product for an immediate join spilling scheme for a database. An aspect includes receiving a command to perform a join of an inner table and an outer table in a database. Another aspect includes performing the join using an immediate join spilling scheme. Another aspect includes spilling a plurality of hash tables to a disk memory, each hash table corresponding to a respective inner table partition. Another aspect includes registering, by a first agent of a plurality of agents that are associated with the join, a set of inner table partitions that require processing by the first agent to complete the join for a first stride of rows of the outer table. Another aspect includes determining whether a hash table corresponding to a registered inner table partition of the first agent has been loaded into a local memory by a second agent of the plurality of agents. Another aspect includes, based on determining that a hash table corresponding to a registered inner table partition of the first agent has been loaded into the local memory by the second agent of the plurality of agents, performing the join of the loaded hash table and the first stride of rows of the outer table by the first agent.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
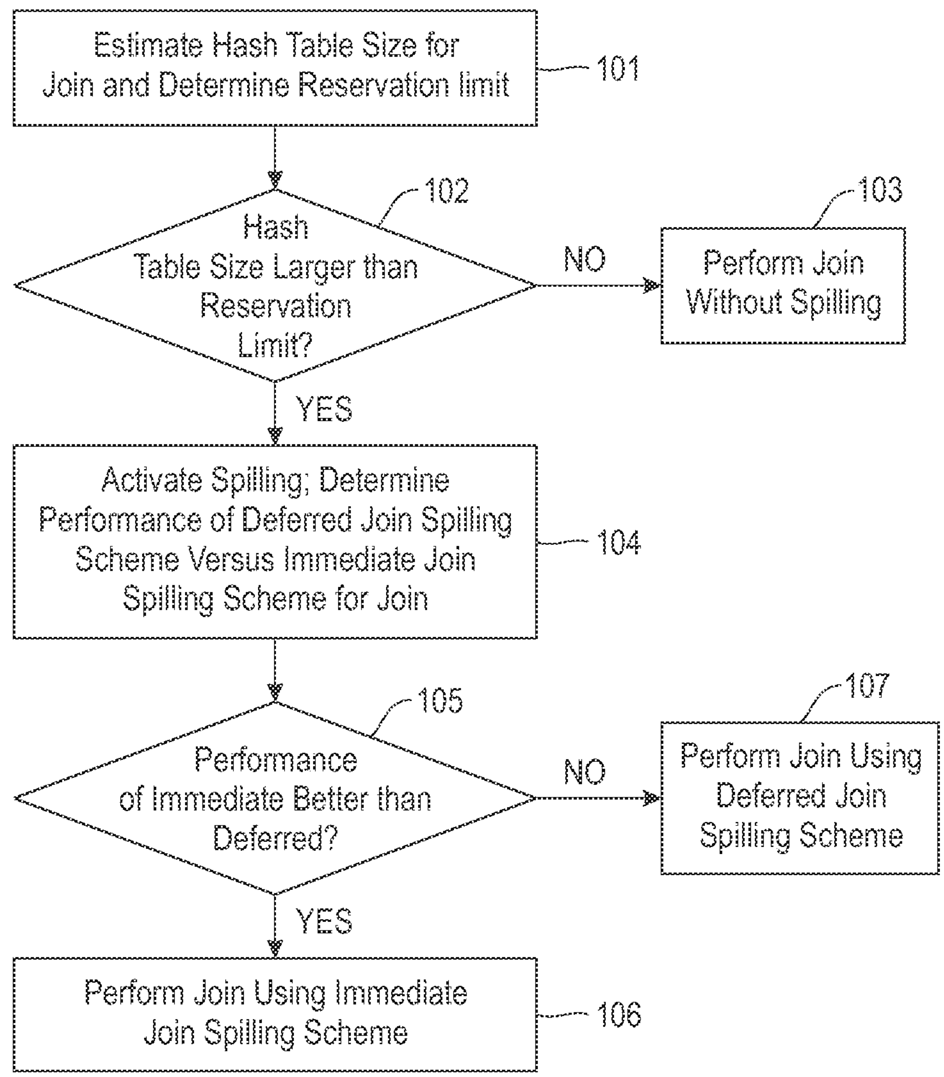
FIG. 1 depicts a process flow for performance-based join spilling for a database in accordance with an embodiment.

Embodiments described herein are directed to an immediate join spilling scheme for a database. Spilling of data into the disk memory may be required in conjunction with processing of database queries such as hash joins and sort merge joins; whether spilling is required is determined based on a reservation limit, which indicates an amount of local memory available to load hash tables for the join. An immediate join spilling scheme or a deferred join spilling scheme may be used for a join that requires spilling. The immediate join spilling scheme and deferred join spilling scheme have different local memory requirements, and load the hash tables corresponding to the inner table partitions during the join in different ways. The I/O cost of the deferred join spilling scheme increases linearly as the outer table is joined with multiple inner tables, and, for joins of some tables, the immediate join spilling scheme may give better performance than the deferred join spilling scheme. In order to respect memory constraints in the local memory, improve performance, and/or reduce total I/O cost for a join that is spilled, a performance metric for a particular join query is evaluated using the different join spilling schemes before performing the join, and the join spilling scheme having the best metric, which may be I/O cost in some embodiments, is selected and used for performing the join.

In the immediate join spilling scheme, each agent participating in the join registers a list of inner table partitions that need to be processed by that agent to complete the join for a stride of rows of the outer table that are currently assigned to the agent. The registrations may be stored and tracked using a to-be-processed table that is located in a shared memory. A hash table that is loaded in the local memory is not unloaded from the local memory until after the loaded hash table has been processed by all of the agents that have registered the inner table partition corresponding to the loaded hash table in the to-be-processed table. Redundant loading of hash tables into the local memory is therefore reduced by forcing agents to reuse already-loaded hash tables, when available, instead of loading a new hash table. An agent may perform a join against a hash table that was loaded by another agent, and an agent may not process the inner table partitions in sequential order. In some embodiments, a loaded hash table is unloaded from the local memory by the last agent that processes the hash table, e.g., a hash table may be unloaded by a different agent than the agent that initially loaded the hash table. An agent waits while other agents are processing the join if there is not space in the local memory for the waiting agent to load a new hash table for processing and if no other hash table that the agent requires for processing the agent's stride of rows of the outer table has been loaded in the local memory by another agent. The agent is woken up from the waiting state when there is space in the local memory for loading a new hash table by the agent, or when the agent is notified that a hash table that requires processing by the agent has been loaded in the local memory by another agent.

In the deferred join spilling scheme, the inner table partitions are divided into inner table partitions groups. The total hash table size of each inner table partition group does not exceed the reservation limit. The hash tables for the inner table partition groups are only loaded and unloaded from the local memory once during the join. After the rows of the outer table are fully processed for a first inner table partition group, a next inner table partition group is loaded from the disk memory into the local memory. This is repeated until all the hash tables for all of the inner table partition groups have been loaded and joined in the local memory.

The relative performance of the immediate join spilling scheme versus the deferred join spilling scheme may be determined based on the I/O cost to process a single stride of rows from the outer table. This is illustrated with respect to an example join of an inner table F and an outer table D, in which the foreign key (fkey) of table F is 4 bytes, payload of F come to 100 bytes, and the payload key of table D is 8 bytes. |D| is 100 million tuples and |F| is 1 billion (B) tuples, so the size of combined hash table on table D is around 800 megabytes (MB). It is assumed for this example that the reservation limit in the local memory for the join is 100 MB, and that another 100 MB is available in the local memory to load and process a single stride of rows of the outer table. Using the immediate join spilling scheme, for every stride of the fkey of table F, a full scan of D is performed. Therefore, the amount of I/O required for loading of table D is the number of strides multiplied by 800 MB. The number of strides is given by 1B tuples/(100 MB/4 byte fkey)), so the amount of I/O required for loading table D in the local memory is 32 GB. The amount of I/O required for loading of table F in the local memory is 100 GB, so the overall amount of I/O required for the immediate join spilling scheme for this example join is 132 GB. To perform the join using the deferred join spilling scheme, 3 separate I/O operations are required to load table F into local memory; i.e., around 300 gigabytes (GB) of I/Os for table F, plus some relatively small amount of I/O for table D. Therefore, in this example, the immediate join spilling scheme gives better I/O performance as compared to the deferred join spilling scheme.

FIG. 1 shows a flowchart of an embodiment of a method 100 for I/O cost based join spilling for a database. First, in block 101, a join query of a database, including an inner table and an outer table in the database, is received, and a total hash table size for the join is estimated. The reservation limit, which indicates an amount of local memory available to load hash tables for the join, is also determined. Then, in block 102, it is determined whether the total hash table size is greater than the reservation limit. If it is determined in block 102 that the total hash table size for the join is less than the reservation limit, flow proceeds to block 103, and the join is performed without spilling. However, if it is determined in block 102 that the total hash table size exceeds the reservation limit, then flow proceeds to block 104.

In block 104, spilling is activated, and the performance of the join using the immediate join spilling scheme versus the deferred join spilling scheme is evaluated. In some embodiments, the total I/O cost of performing the join using an immediate join spilling scheme is determined, and the total I/O cost of performing the join using a deferred join spilling scheme is also determined. The I/O cost may be determined without knowledge of the cardinality of the outer table. The I/O cost of each join spilling scheme may be determined for a single, predetermined stride of rows of the outer table for each of the join spilling schemes in some embodiments, because, if one join spilling scheme outperforms the other for a join of the single stride of rows of the outer table, that join spilling scheme will also outperform the other join spilling scheme across the entire join. The determination of block 104 may be made based on any appropriate performance characteristic of the immediate join spilling scheme versus the deferred join spilling scheme for the particular join in various embodiments.

It is then determined in block 105 whether the performance of the intermediate join spilling scheme is better than the performance of the deferred join spilling scheme for the join. If the immediate join spilling scheme is determined to have the better performance in block 105, flow proceeds to block 106, in which the join is performed using the immediate join spilling scheme. The immediate join spilling scheme is discussed below in greater detail with respect to method 200 of FIG. 2. If the deferred join spilling scheme is determined to have the better performance in block 105, flow proceeds to block 107, in which the join is performed using the deferred join spilling scheme. The deferred join spilling scheme is discussed below in greater detail with respect to method 300 of FIG. 3.

Figure 2A:
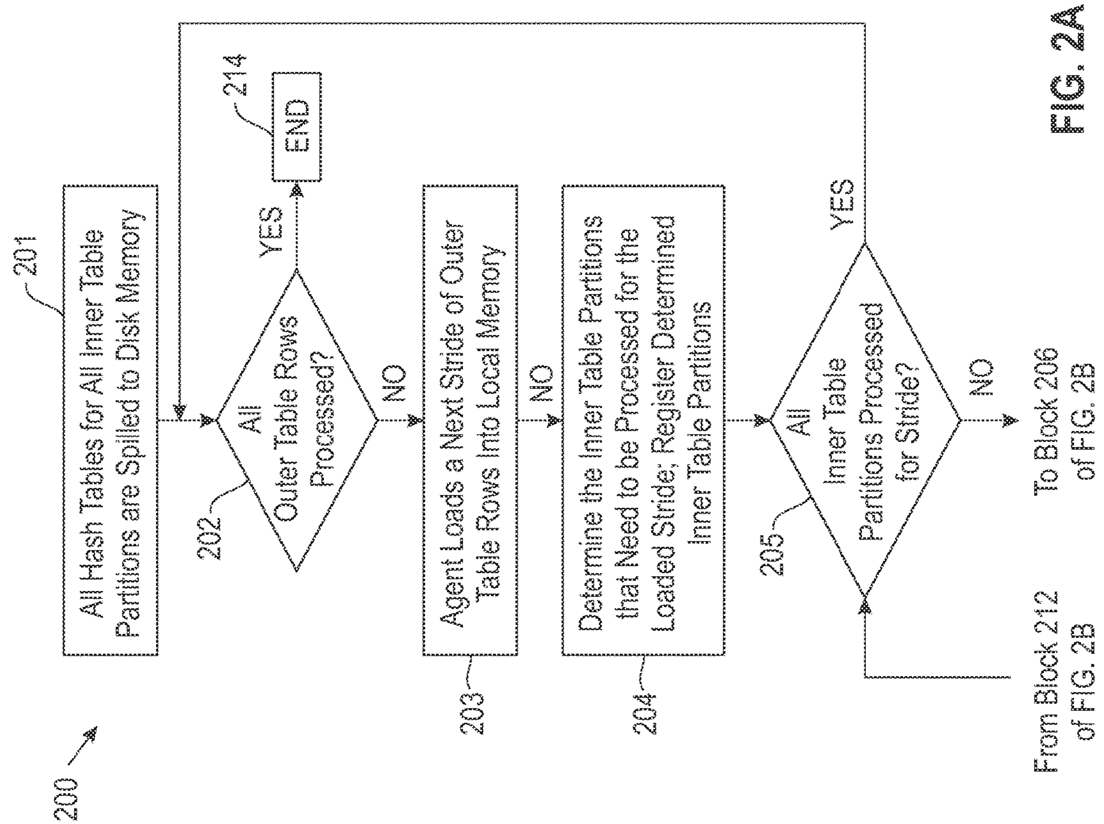
FIGS. 2A-B depict a process flow for an immediate join spilling scheme for a database in accordance with an embodiment.
Figure 2B:
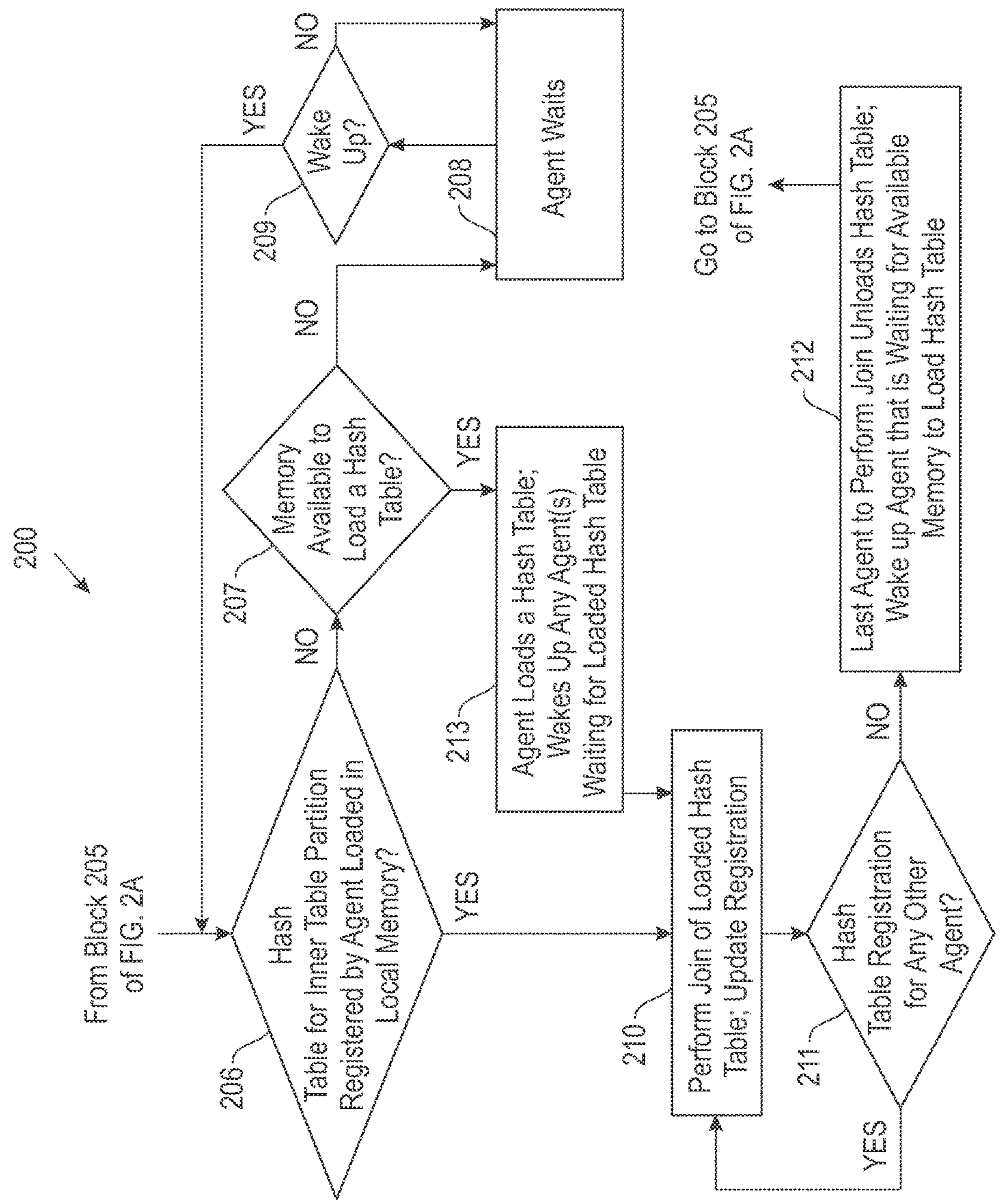

FIGS. 2A-B illustrates a flowchart of an embodiment of method 200 for an immediate join spilling scheme, which is performed in block 106 of method 100 of FIG. 1. First, in block 201 of FIG. 2A, the hash tables for all of the inner table partitions for the join are spilled to the disk memory. All of the agents participating in the join then perform blocks 202-214 concurrently. In block 202, the agent determines if all of the rows of the outer table have been processed for the join. If it is determined in block 202 that all of the rows of the outer table have not been processed, flow proceeds from block 202 to block 203, in which the agent loads a next stride of rows of the outer table that have not yet been processed into the local memory. Next, in block 204, the agent determines which inner table partitions need to be processed for the stride of rows of the outer table that were loaded by the agent in block 203, and registers the determined inner table partitions in a to-be-processed table. Then, in block 205, the agent determines whether all of the inner table partitions have been processed for the agent's current stride of rows of the outer table. If it is determined in block 205 that all of the inner table partitions have not been processed for the agent's current stride of rows of the outer table, flow proceeds from block 205 of FIG. 2A to block 206 of FIG. 2B. In block 206 of FIG. 2B, the agent determines whether a hash table for any inner table partition that was registered by the agent in block 204 for the agent's current stride of rows is currently loaded in the local memory; i.e., whether the agent may proceed with performing the join for the agent's current stride of rows of the outer table using a hash table that was loaded into the local memory by another agent. If it is determined in block 206 that there is no hash table that may be used by the agent to perform the join currently loaded in the local memory, flow proceeds from block 206 to block 207, in which it is determined whether there is space available in the local memory for the agent to load a hash table for an inner table partition that is needed by the agent (i.e., that was registered by the agent in block 204 of FIG. 2A). The determination of block 207 is made based on the reservation limit. If it is determined in block 207 that there is not sufficient space in the local memory for the agent to load a hash table, flow proceeds from block 207 to blocks 208 and 209, in which the agent waits (block 208) until the agent is woken from the waiting state in block 209. The agent is woken from the waiting state in block 209 when there is either a hash table loaded in the local memory for an inner table partition that was registered by the agent in block 204 of FIG. 2A for the agent's current stride of rows of the outer table in block 204, or when there is sufficient space available for the agent to load a hash table for a registered inner table partition.

When the agent is woken up in block 209, flow proceeds back to block 206, in which the agent determines whether a hash table for any inner table partition that was registered by the agent in block 204 of FIG. 2A for the agent's current stride of rows of the outer table is currently loaded in the local memory. If it is determined in block 206 that there is a hash table that may be used by the agent to perform the join currently loaded in the local memory, flow proceeds from block 206 to block 210, in which the agent performs the join of the agent's current stride of rows of the outer table and the loaded hash table, and updates its registration in the to-be-processed table to reflect the processed inner table partition. Flow then proceeds to block 211, in which it is determined whether the loaded hash table is registered in the to-be-processed table as being needed by any other agent. If it is determined in block 211 that the hash table is registered in the to-be-processed table as being needed by another agent, flow proceeds from block 211 to block 210, in which the join is performed using the loaded hash table by any agent(s) that were determined in block 211, and flow proceeds from block 210 back to block 211. When it is determined in block 211 that the hash table is not registered in the to-be-processed table as being needed by any other agent, flow proceeds from block 211 to block 212, in which the last agent to perform the join using the hash table in block 210 unloads the hash table from the local memory, and an agent that is waiting for available memory to load another hash table is woken up (corresponding to a Yes condition in block 209 for another agent). Flow then proceeds from block 212 back to block 202 of FIG. 2A.

If it was determined in block 206, by the agent that was woken up in block 208, that there is not a hash table that may be used by the agent to perform the join currently loaded in the local memory, flow proceeds from block 206 to block 207, in which it is determined that there is space available in the local memory for the agent to load a hash table for an inner table partition that is needed by the agent (i.e., that was registered by the agent in block 204), and flow proceeds from block 207 to block 213. In block 213, the agent loads a hash table into the local memory and wakes up any agents that have registered the inner table partition corresponding to the loaded hash table in the to-be-processed table (corresponding to a Yes condition in block 209 for another agent). Flow then proceeds from block 213 to block 210, in which the join is performed using the loaded hash table by all agents that have registered the inner table partition corresponding to the loaded hash table. Flow then proceeds from block 210 through blocks 211 and 212 as described above.

From block 212, flow returns to block 205 of FIG. 2A, in which the agent determines whether all of the inner table rows have been processed for the agent's current stride of rows of the outer table. If it is determined in block 205 that all of the inner table partitions have not been processed for the agent's current stride of rows of the outer table, the agent repeats blocks 206-213 of FIG. 2B as described above until it is determined in block 205 of FIG. 2A that all of the inner table partitions have been processed for the agent's current stride of rows of the outer table. When it is determined in block 205 that all of the inner table partitions have been processed for the agent's current stride of rows of the outer table, flow proceeds from block 205 to block 202, in which it is determined whether all of the rows of the outer table have been processed for the join. If it is determined in block 202 that all of the rows of the outer table have not been processed for the join, the agent loads a next stride of rows of the outer table in block 203, and repeats blocks 204-213 for the next stride of rows of the outer table. When it is determined in block 202 that all of the rows of the outer table have been processed for the join, the join is complete, flow proceeds from block 202 to block 214, and method 200 ends.

The stride size of rows of the outer table (i.e., the number of rows loaded by an agent in block 203 of FIG. 2A) that is used for the immediate join spilling scheme as described by method 200 of FIGS. 2A-B may vary in size in various embodiments. If the stride size is relatively large, the overall I/O cost of the immediate join spilling scheme may be reduced. However, if the stride size is relatively small, hash tables corresponding to inner table partitions that are needed to process multiple strides of rows of the outer table may be cached in the local memory simultaneously. In some embodiments, the stride size used in the immediate join spilling scheme may be adjusted based on the amount of available memory in the local memory during processing of a join query, and the number of concurrently loaded hash tables in the local memory may be increased or decreased appropriately, such that spilling overhead may be avoided if the required space in the local memory becomes available during the join.

Figure 3A:
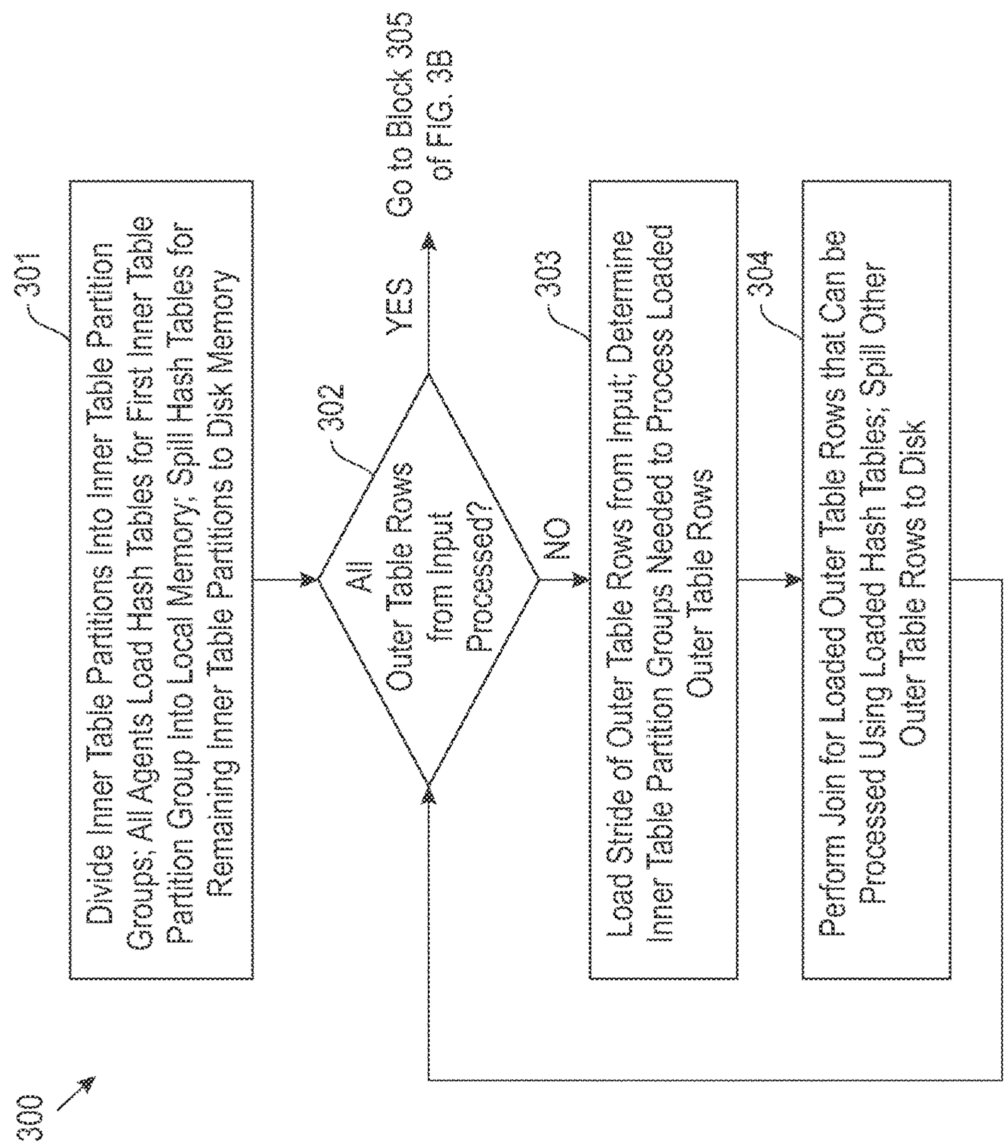
FIGS. 3A-B depict a process flow for a deferred join spilling scheme for a database in accordance with an embodiment.
Figure 3B:
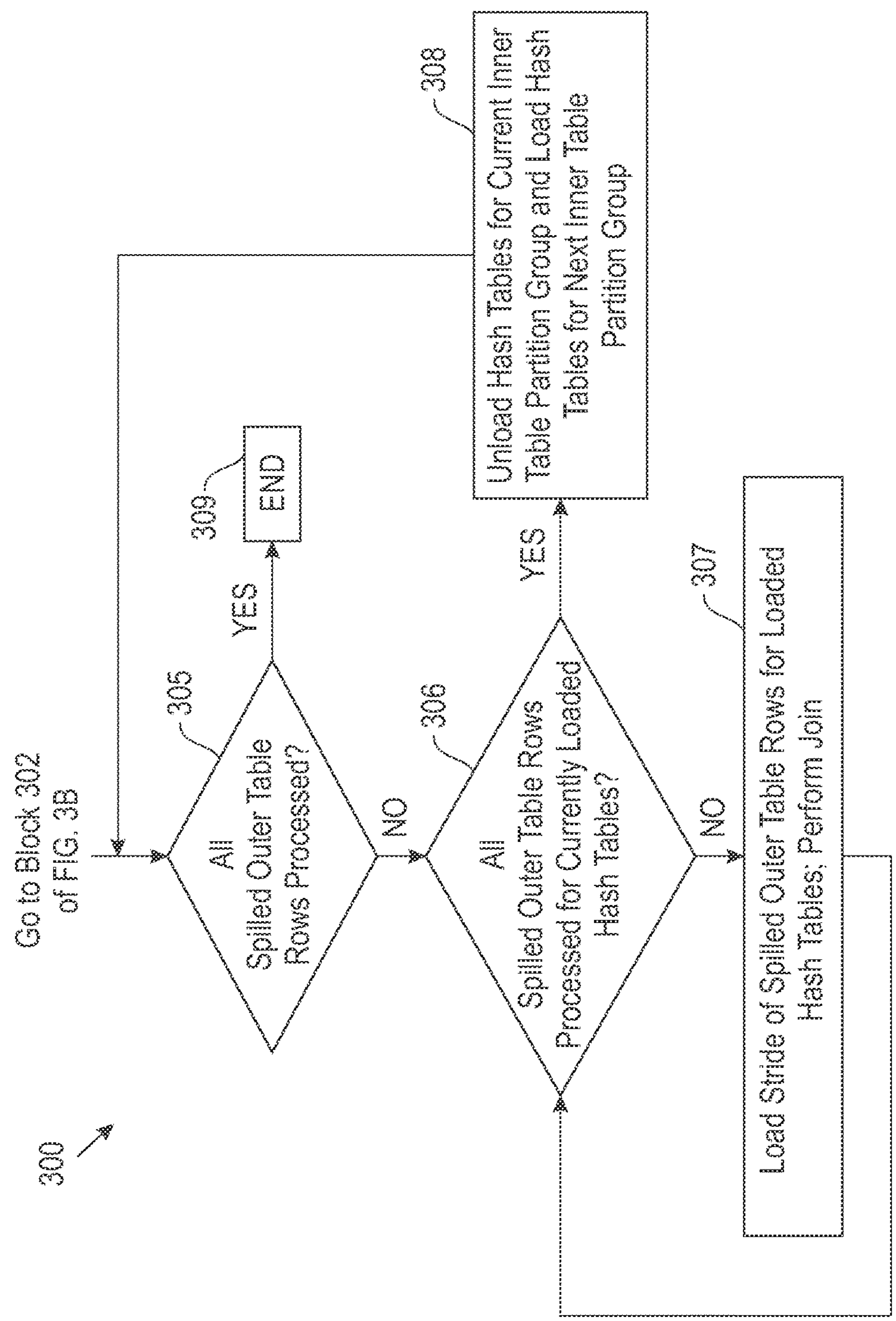

FIGS. 3A-B illustrates a flowchart of an embodiment of a method 300 for a deferred join spilling scheme, which is performed in block 107 of method 100 of FIG. 1. First, in block 301 of FIG. 3A, the inner table partitions are divided into inner table partition groups. In some embodiments, an inner table partition group is a maximum number of inner table partitions that will fit into the local memory, as determined by the reservation limit. In other embodiments, an inner table partition group may be about half of the reservation limit; this is discussed in further detail below. All of the agents participating in the join work together to load the hash tables corresponding to a first inner table partition group into the local memory in block 301, and the hash tables corresponding to the remaining inner table partition groups are spilled to the disk memory. The agents participating in the join then each perform blocks 302 to 309 of FIGS. 3A-B concurrently. In block 302, an agent determines whether all of the rows of the outer table from the input have been processed. If it is determined in block 302 that all of the rows of the outer table from the input have not been processed, flow proceeds from block 302 to block 303, in which the agent loads a stride of rows of the outer table from the input, and determines the inner table partitions groups necessary to perform the join for the loaded rows of the outer table. Then, in block 304, the agent performs the join for its rows of the outer table that may be processed using the currently loaded hash tables, and spills any remaining of its rows of the outer table to the disk memory. Flow then returns from block 304 to block 302.

If it is determined in block 302 that all of the rows of the outer table from the input have been processed, flow proceeds from block 302 to block 305 of FIG. 3B. In blocks 305-309 of FIG. 3B, the rows of the outer table that were spilled to the disk memory by the agent in block 304 are processed. In block 305 of FIG. 3B, it is determined whether all of the spilled rows of the outer table have been processed. If it is determined in block 305 that all of the spilled rows of the outer table have not been processed, flow proceeds from block 305 to block 306, in which it is determined whether all of the spilled rows of the outer table have been processed for the currently loaded hash tables corresponding to the current inner table partition group. If it is determined in block 306 that all of the spilled rows of the outer table have not been processed for the currently loaded hash tables corresponding to the current inner table partition group, flow proceeds from block 306 to block 307, in which a stride of the spilled rows of the outer table are loaded in the local memory and the join is performed using the currently loaded hash tables. Blocks 306 and 307 are repeated until it is determined in block 306 that all of the spilled rows of the outer table have been processed for the currently loaded hash tables corresponding to the current inner table partition group, at which point flow proceeds from block 306 to block 308. In block 308, the currently loaded hash tables are unloaded from the local memory, and the hash tables for a next inner table partition group are loaded into the local memory from the disk memory. Flow then proceeds from block 308 to block 305. Blocks 305-308 are repeated until it is determined in block 305 that all of the spilled rows of the outer table have been processed, at which point the join is complete, flow proceeds to block 309, and method 300 ends.

During the loading of hash tables corresponding to inner table partition groups from the disk memory into the local memory during block 308 of FIG. 3B, the processor may be relatively idle. To reduce this processor idle time, some embodiments of a deferred join spilling scheme, as discussed with respect to method 300 of FIGS. 3A-B, may be parallelized by processing multiple inner table partition groups concurrently. The parallelism is restricted to honor the reservation limit for the join in the local memory. The size of an inner table partition group may be selected based on the reservation limit such that the hash tables corresponding to two or more inner table partition groups may be loaded into the local memory simultaneously. For example, the hash tables for each inner table partition group may only require half of the available space in the local memory, and each inner table partition group may be assigned to half of the available agents for processing. Therefore, while the hash tables for a first inner table partition group is being replaced by the hash tables for a next inner table partition group (block 308 of FIG. 3B) in the local memory, the hash tables for another inner table partition group remain in the local memory during the loading, and can be processed by one or more agents during the replacement of the hash tables for the first inner table partition group.

Figure 4:
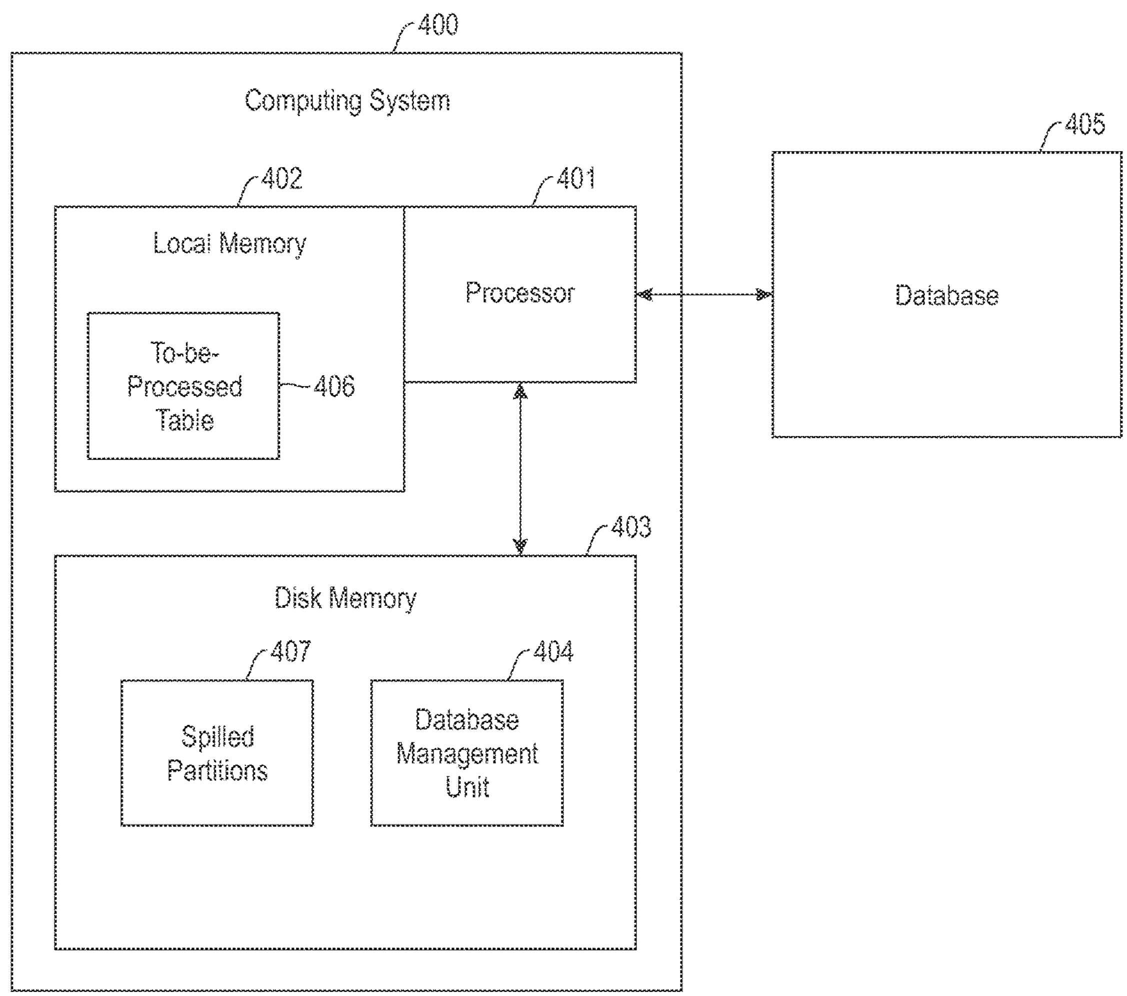
FIG. 4 illustrates a computing system an immediate join spilling scheme for a database in accordance with an embodiment.

FIG. 4 illustrates an embodiment of a computing system 400 for I/O cost based join spilling for a database. Computing system 400 includes a processor 401 that is in communication with a local memory 402, disk memory 403, and a database management unit 404. Computing system 400 is in communication with a database 405, which includes one or more tables that are divided into one or more pages. Database management unit 404 in computing system 400 may implement methods 100, 200, and 300 of FIGS. 1-3 to manage database queries of database 405. Local memory 402 is closer to processor 401 and relatively small and fast as compared to disk memory 403, and comprises DRAM in some embodiments. Processor 401 receives join queries for data in database 405, and processes, in conjunction with database management unit 404, a join query by loading the data relevant to the join query in local memory 402, and, as required, spilling of spilled partitions 407 into disk memory 403. Local memory 402 holds a to-be-processed table 406, which is used in conjunction with the immediate join spilling scheme of method 200 of FIG. 2. Processor 401 maintains a plurality of agents, or threads, that process queries of database 405 concurrently. Each agent may, for example, process a different set of input rows of a single join in parallel. Computing system 400 is shown for illustrative purposes only; for example, to-be-processed table 406 may be stored in any appropriate location in computing system 400.

Figure 5:
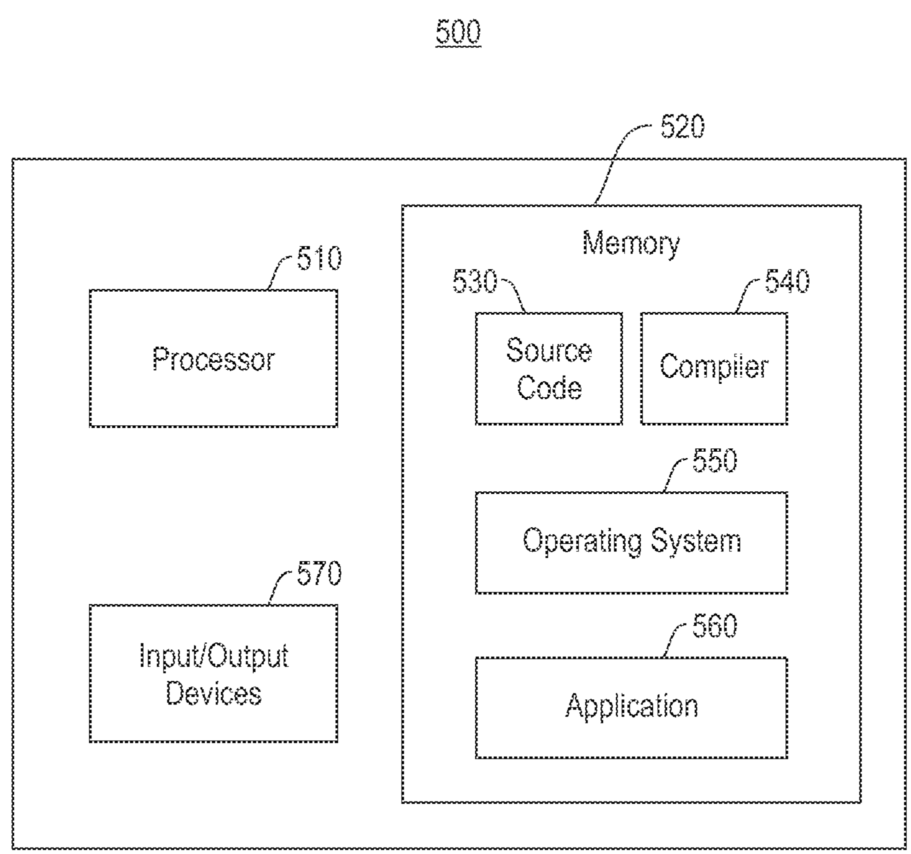
FIG. 5 illustrates a computer system that is used in conjunction with an immediate join spilling scheme for a database in accordance with an embodiment.

FIG. 5 illustrates an example of a computer 500 which may be utilized by exemplary embodiments of I/O cost based join spilling for a database. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include improved performance for join spilling in a database.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIG.ures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:

receiving a command to perform a join of an inner table and an outer table in a database; and performing the join using an immediate join spilling scheme, the immediate join spilling scheme comprising:

spilling a plurality of hash tables to a disk memory, each hash table corresponding to a respective inner table partition;

registering, by a first agent of a plurality of agents that are associated with the join, a set of inner table partitions that require processing by the first agent to complete the join for a first stride of rows of the outer table;

determining whether a hash table corresponding to a registered inner table partition of the first agent has been loaded into a local memory by a second agent of the plurality of agents, wherein the local memory is smaller and faster than the disk memory;

based on determining that the hash table corresponding to the registered inner table partition of the first agent has been loaded into the local memory by the second agent of the plurality of agents, performing the join of the loaded hash table and the first stride of rows of the outer table by the first agent, wherein the loaded hash table that is loaded in the local memory is not unloaded from the local memory until after the loaded hash table has been processed by each of the plurality of agents that have registered an inner table partition corresponding to the loaded hash table in a to-be-processed table; and unloading the loaded hash table from the local memory subsequent to the loaded hash table being processed by each of the plurality of agents that have registered the inner table partition corresponding to the loaded hash table in the to-be-processed table, wherein the loaded hash table is unloaded from the local memory by one of the plurality of agents other than the first agent.

2. The method of claim 1, further comprising based on determining that no hash table corresponding to a registered inner table partition of the first agent has been loaded into the local memory by the second agent of the plurality of agents, determining, based on a reservation limit, whether there is sufficient space available in the local memory to load a hash table corresponding to a first inner table partition that is registered by the first agent from the disk memory into the local memory;

based on determining that there is sufficient space available in the local memory to load the hash table corresponding to the first inner table partition of the first agent, loading the hash table from the disk memory into the local memory by the first agent;

determining whether the first inner table partition is registered by one or more other agents of the plurality of agents;

based on determining that the first inner table partition is registered by one or more other agents of the plurality of agents, notifying the one or more other agents; and performing the join using the loaded hash table by the first agent and the one or more other agents.

3. The method of claim 2, further comprising:

going into a waiting state by the first agent based on determining that that no hash table corresponding to a registered inner table partition of the first agent has been loaded in a local memory by the second agent of the plurality of agents, and that there is not sufficient space available in the local memory to load the hash table corresponding to the first inner table partition by the first agent; and waking up the first agent from the waiting state based on determining that that a hash table corresponding to a registered inner table partition of the first agent has been loaded in a local memory by the second agent of the plurality of agents or based on determining that there is sufficient space available in the local memory to load the hash table corresponding to the first inner table partition by the first agent.

4. The method of claim 1, wherein each of the plurality of agents performs the join for a respective stride of rows of the outer table.

5. The method of claim 1, further comprising:

based on receiving the command to perform the join, determining a performance metric for the join using the immediate join spilling scheme, and determining the performance metric for the join using a deferred join spilling scheme;

based on determining that the performance metric for the join using the immediate join spilling scheme is better than the performance metric for the join using the deferred join spilling scheme, performing the join using the immediate join spilling scheme; and based on determining that the performance metric for the join using the deferred join spilling scheme is better than the performance metric for the join using the immediate join spilling scheme, performing the join using the deferred join spilling scheme.

6. The method of claim 5, wherein the performance metric comprises an input/output (I/O) cost of performing the join;

wherein determining that the performance metric for the join using the immediate join spilling scheme is better than the performance metric for the join using the deferred join spilling scheme comprises determining that the I/O cost of performing the join using the immediate join spilling scheme is lower than the I/O cost of performing the join using the deferred join spilling scheme; and wherein determining that the performance metric for the join using the deferred join spilling scheme is better than the performance metric for the join using the immediate join spilling scheme comprises determining that the I/O cost of performing the join using the deferred join spilling scheme is lower than the I/O cost of performing the join using the immediate join spilling scheme.

7. The method of claim 5, wherein the deferred join spilling scheme comprises:

dividing the inner table partitions into inner table partition groups based on a reservation limit in the local memory;

loading a hash table for a first inner table partition group into the local memory;

performing the join of the first inner table partition group and a plurality of rows of the outer table;

based on performing the join of the first inner table partition group and the plurality of rows of the outer table, unloading the hash table for the first inner table partition group from the local memory, and loading a hash table for a second inner table partition group in the local memory.

8. The method of claim 7, wherein a size of each of the inner table partition groups is selected such that the hash tables corresponding to more than one inner table partition group are loaded in the local memory simultaneously; and further comprising:

performing the join of a third inner table partition group and a plurality of rows of the outer table while unloading the hash table for the first inner table partition group from the local memory and loading the hash table for the second inner table partition group in the local memory.

9. A computer program product comprising:

a computer readable storage medium having program code embodied therewith, the program code executable by a processor to:

receiving a command to perform a join of an inner table and an outer table in a database; and performing the join using an immediate join spilling scheme, the immediate join spilling scheme comprising:

spilling a plurality of hash tables to a disk memory, each hash table corresponding to a respective inner table partition;

registering, by a first agent of a plurality of agents that are associated with the join, a set of inner table partitions that require processing by the first agent to complete the join for a first stride of rows of the outer table;

determining whether a hash table corresponding to a registered inner table partition of the first agent has been loaded into a local memory by a second agent of the plurality of agents, wherein the local memory is smaller and faster than the disk memory;

based on determining that the hash table corresponding to the registered inner table partition of the first agent has been loaded into the local memory by the second agent of the plurality of agents, performing the join of the loaded hash table and the first stride of rows of the outer table by the first agent, wherein the loaded hash table that is loaded in the local memory is not unloaded from the local memory until after the loaded hash table has been processed by each of the plurality of agents that have registered an inner table partition corresponding to the loaded hash table in a to-be-processed table; and unloading the loaded hash table from the local memory subsequent to the loaded hash table being processed by each of the plurality of agents that have registered the inner table partition corresponding to the loaded hash table in the to-be-processed table, wherein the loaded hash table is unloaded from the local memory by one of the plurality of agents other than the first agent.

10. The computer program product of claim 9, further comprising based on determining that no hash table corresponding to a registered inner table partition of the first agent has been loaded into the local memory by the second agent of the plurality of agents, determining, based on a reservation limit, whether there is sufficient space available in the local memory to load a hash table corresponding to a first inner table partition that is registered by the first agent from the disk memory into the local memory;

based on determining that there is sufficient space available in the local memory to load the hash table corresponding to the first inner table partition of the first agent, loading the hash table from the disk memory into the local memory by the first agent;

determining whether the first inner table partition is registered by one or more other agents of the plurality of agents;

based on determining that the first inner table partition is registered by one or more other agents of the plurality of agents, notifying the one or more other agents; and performing the join using the loaded hash table by the first agent and the one or more other agents.

11. The computer program product of claim 10, further comprising:

going into a waiting state by the first agent based on determining that that no hash table corresponding to a registered inner table partition of the first agent has been loaded in a local memory by the second agent of the plurality of agents, and that there is not sufficient space available in the local memory to load the hash table corresponding to the first inner table partition by the first agent; and waking up the first agent from the waiting state based on determining that that a hash table corresponding to a registered inner table partition of the first agent has been loaded in a local memory by the second agent of the plurality of agents or based on determining that there is sufficient space available in the local memory to load the hash table corresponding to the first inner table partition by the first agent.

12. The computer program product of claim 9, further comprising:

based on receiving the command to perform the join, determining a performance metric for the join using the immediate join spilling scheme, and determining the performance metric for the join using a deferred join spilling scheme;

based on determining that the performance metric for the join using the immediate join spilling scheme is better than the performance metric for the join using the deferred join spilling scheme, performing the join using the immediate join spilling scheme; and based on determining that the performance metric for the join using the deferred join spilling scheme is better than the performance metric for the join using the immediate join spilling scheme, performing the join using the deferred join spilling scheme.

13. The computer program product of claim 12, wherein the deferred join spilling scheme comprises:

dividing the inner table partitions into inner table partition groups based on a reservation limit in the local memory;

loading a hash table for a first inner table partition group into the local memory;

performing the join of the first inner table partition group and a plurality of rows of the outer table;

based on performing the join of the first inner table partition group and the plurality of rows of the outer table, unloading the hash table for the first inner table partition group from the local memory, and loading a hash table for a second inner table partition group in the local memory.

14. The computer program product of claim 13, wherein a size of each of the inner table partition groups is selected such that the hash tables corresponding to more than one inner table partition group are loaded in the local memory simultaneously; and further comprising:

performing the join of a third inner table partition group and a plurality of rows of the outer table while unloading the hash table for the first inner table partition group from the local memory and loading the hash table for the second inner table partition group in the local memory.

15. A system comprising:

a processor;

a database;

a disk memory; and a local memory, the local memory being closer to the processor than the disk memory;

the processor configured to:

receive a command to perform a join of an inner table and an outer table in the database; and perform the join using an immediate join spilling scheme, the immediate join spilling scheme comprising:

spill a plurality of hash tables to the disk memory, each hash table corresponding to a respective inner table partition;

register, by a first agent of a plurality of agents that are associated with the join, a set of inner table partitions that require processing by the first agent to complete the join for a first stride of rows of the outer table;

determine whether a hash table corresponding to a registered inner table partition of the first agent has been loaded into the local memory by a second agent of the plurality of agents, wherein the local memory is smaller and faster than the disk memory;

based on determining that the hash table corresponding to the registered inner table partition of the first agent has been loaded into the local memory by the second agent of the plurality of agents, perform the join of the loaded hash table and the first stride of rows of the outer table by the first agent, wherein the loaded hash table that is loaded in the local memory is not unloaded from the local memory until after the loaded hash table has been processed by each of the plurality of agents that have registered an inner table partition corresponding to the loaded hash table in a to-be-processed table; and unload the loaded hash table from the local memory subsequent to the loaded hash table being processed by each of the plurality of agents that have registered the inner table partition corresponding to the loaded hash table in the to-be-processed table, wherein the loaded hash table is unloaded from the local memory by one of the plurality of agents other than the first agent.

16. The system of claim 15, further comprising based on determining that no hash table corresponding to a registered inner table partition of the first agent has been loaded into the local memory by the second agent of the plurality of agents, determining, based on a reservation limit, whether there is sufficient space available in the local memory to load a hash table corresponding to a first inner table partition that is registered by the first agent from the disk memory into the local memory;

based on determining that there is sufficient space available in the local memory to load the hash table corresponding to the first inner table partition of the first agent, loading the hash table from the disk memory into the local memory by the first agent;

determining whether the first inner table partition is registered by one or more other agents of the plurality of agents;

based on determining that the first inner table partition is registered by one or more other agents of the plurality of agents, notifying the one or more other agents; and performing the join using the loaded hash table by the first agent and the one or more other agents.

17. The system of claim 16, further comprising:

going into a waiting state by the first agent based on determining that that no hash table corresponding to a registered inner table partition of the first agent has been loaded in a local memory by the second agent of the plurality of agents, and that there is not sufficient space available in the local memory to load the hash table corresponding to the first inner table partition by the first agent; and waking up the first agent from the waiting state based on determining that that a hash table corresponding to a registered inner table partition of the first agent has been loaded in a local memory by the second agent of the plurality of agents or based on determining that there is sufficient space available in the local memory to load the hash table corresponding to the first inner table partition by the first agent.

* * * * *